(12) United States Patent
Lee et al.

(10) Patent No.: US 7,396,398 B2
(45) Date of Patent: *Jul. 8, 2008

(54) INK COMPOSITION

(75) Inventors: Jong-in Lee, Suwon-si (KR); Seung-min Ryu, Yongin-si (KR); Su-aa Jung, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 370 days.

This patent is subject to a terminal disclaimer.

(21) Appl. No.: 10/964,729

(22) Filed: Oct. 15, 2004

(65) Prior Publication Data

US 2005/0098063 A1   May 12, 2005

(30) Foreign Application Priority Data

Nov. 12, 2003   (KR) ...................... 10-2003-0079907

(51) Int. Cl.
*C09D 11/00* (2006.01)

(52) U.S. Cl. .............. 106/31.43; 106/31.46; 106/31.47; 106/31.49; 106/31.58; 106/31.75; 106/31.76; 106/31.77; 106/31.78; 106/31.86

(58) Field of Classification Search .............. 106/31.43, 106/31.75, 31.46, 31.47, 31.49, 31.76, 31.77, 106/31.78, 31.58, 31.86
See application file for complete search history.

(56) References Cited

U.S. PATENT DOCUMENTS

| | | | | |
|---|---|---|---|---|
| 4,365,998 A | * | 12/1982 | Sugiyama et al. | 106/31.49 |
| 5,173,112 A | | 12/1992 | Matrick et al. | |
| 5,205,861 A | * | 4/1993 | Matrick | 524/101 |
| 5,354,369 A | * | 10/1994 | Shimomura et al. | 106/31.43 |
| 5,421,871 A | * | 6/1995 | Onishi et al. | 106/31.49 |
| 5,451,251 A | * | 9/1995 | Mafune et al. | 106/31.48 |
| 5,580,373 A | | 12/1996 | Lane et al. | |
| 5,686,508 A | * | 11/1997 | Shimomura et al. | 523/161 |
| 5,972,431 A | * | 10/1999 | Marsella et al. | 427/384 |
| 5,985,968 A | * | 11/1999 | Lassila et al. | 524/211 |
| 6,102,998 A | * | 8/2000 | Iu et al. | 106/31.58 |
| 6,281,170 B1 | | 8/2001 | Marsella et al. | |
| 6,582,501 B2 | * | 6/2003 | Ryu et al. | 106/31.46 |
| 7,125,444 B2 | * | 10/2006 | Taguchi et al. | 106/31.46 |
| 2004/0254264 A1 | * | 12/2004 | Suzuki et al. | 523/160 |
| 2005/0268816 A1 | * | 12/2005 | Lee et al. | 106/31.47 |
| 2006/0117994 A1 | * | 6/2006 | Ryu et al. | 106/31.58 |

FOREIGN PATENT DOCUMENTS

| | | | |
|---|---|---|---|
| JP | 59-223766 | | 12/1984 |
| JP | 05/086314 | * | 4/1993 |
| JP | 6-100825 | | 4/1994 |
| KR | 135639 | | 4/1998 |

OTHER PUBLICATIONS

Derwent abstract of JP05/086314, Apr. 1993.*

* cited by examiner

*Primary Examiner*—Helene Klemanski
(74) *Attorney, Agent, or Firm*—Roylance, Abrams, Berdo & Goodman, L.L.P.

(57) ABSTRACT

An ink composition is provided including an amide compound represented by formula I, a coloring agent and a solvent. The amide compound and the polyhydric alcohol in the ink composition decrease the mobility of coloring agents and increase the adhesion to media, thereby minimizing the bleeding between colors of printed images, and improving the water fastness and dry and wet rub fastness to provide good color fastness on papers. The ink composition also improves the quality of the printed image, and also has good long-term storage stability. Thus, the ink composition can be widely used as ink-jet inks for ink-jet printers, printing inks, paints, textile printing, paper manufacturing, cosmetics manufacturing, ceramic industry, etc.

11 Claims, No Drawings

INK COMPOSITION

CROSS-REFERENCE TO RELATED APPLICATION

This application claims the priority of Korean Patent Application No. 2003-79907, filed on Nov. 12, 2003, in the Korean Intellectual Property Office, the disclosure of which is incorporated herein by reference in its entirety.

BACKGROUND OF THE INVENTION

1. Field of the Invention

The present invention relates to an ink composition. More particularly, the invention relates to an ink composition that resists bleeding between a printed image and original color, exhibits improved water fastness of the printed image, and exhibits improved dry and wet rub fastness.

2. Description of the Related Art

In general, coloring agents embody their inherent colors by selectively absorbing or reflecting visible light. The coloring agents are classified as dyestuffs and pigments.

Dyestuffs are used in many materials to be dyed, such as fibers, leathers, furs, and papers thereby providing considerable fastness to daylight washing, friction, etc. Pigments are coloring matters in the form of particulates. The particulates are not absorbed into the material to be dyed but are adhered to the surface of the material to be dyed, by physical means (e.g., adhesion, etc.) thereby providing the inherent color.

Dyestuffs are dissolved in solvents such as water, alcohol or other organic solvents and applied directly or indirectly to the substrate being dyed. Pigments are generally insoluble to most solvents, and thus it is most important to disperse a pigment particulate homogeneously in a solution, suspension or dispersion. The pigments are typically maintained in a stable dispersed state to inhibit re-aggregation of the pigments.

Water-soluble dyestuff-type inks are very superior in long-term storage stability, maintaining homogeneity of the ink, and retaining clear color and brightness. However, water-soluble dyestuff type inks exhibit poor water fastness, and light resistance.

Pigment-type inks have high optical density (OD), superior water fastness and light resistance, and exhibit little bleeding between colors. However, the color clearness is poor and its long-term storage stability is low compared to the dyestuff-type inks. Also, the images printed by the pigment-type inks have poor dry and wet rub fastnesses.

When printing in colors (multicolor printing) with dye-stuffs or pigments, bleeding at interfaces of each color occurs, and thus clearness of images is reduced. The rub fastness and color fastness can be improved by decreasing mobility of the coloring agent on receptors such as a paper. Examples of ink compositions for ink-jet printers comprising a pigment, a water-soluble resin and a specific alcohol are disclosed in U.S. Pat. Nos. 5,172,133 and 5,529,616.

However, the ink-jet ink used in jet printing is applied through nozzles, so that it is necessary to maintain a low viscosity. Thus, the amount of the polymer binder used in the ink is limited. A minimum amount of the binder is required to sufficiently bind pigment particles to the substrate. When the amount of the binder is too low, the ink exhibits unsatisfactory rub fastness and color fastness.

Another approach to improve rub fastness and color fastness by decreasing mobility of a coloring agent on receptors, by chelating a metal ion as disclosed in U.S. Pat. No. 4,694,302. Rub and color fastness are also purported to be improved by the reaction of a cation and an anion as disclosed in U.S. Pat. No. 5,623,294, and by a reaction of polymer as disclosed in U.S. Pat. No. 5,629,359. However, the method of chelating a metal ion has difficulty in obtaining long-term storage stability due to a reaction of each ink constituent and a metal ion contained in an ink. The method of reacting a cation and an anion also has poor performance due to a reaction between the substrate and the ions as well as a reaction of ink constituents. Also, the method of reacting a polymer has an environmental burden due to an unreacted monomer, the need for a curing apparatus and curing time, and the difficulty in obtaining long-term storage stability.

Thus, an ink composition is required to improve the color fastness such as bleeding resistance, rub fastness, water fastness, etc. and to provide improved quality of a printed image as well as long-term storage stability.

SUMMARY OF THE INVENTION

The present invention provides an ink composition including an amide compound represented by Formula I below, a coloring agent and a solvent:

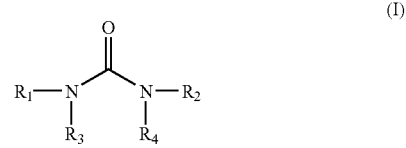

(I)

wherein $R_1$, $R_2$, $R_3$ and $R_4$ are independently a hydrogen atom, a substituted or unsubstituted $C_1$-$C_{20}$ alkyl group, a substituted or unsubstituted $C_1$-$C_{20}$ heteroalkyl group, a substituted or unsubstituted $C_2$-$C_{20}$ alkenyl group, a substituted or unsubstituted $C_1$-$C_{20}$ alkoxy group, a substituted or unsubstituted $C_1$-$C_{20}$ alkyl sulfonamide group, a substituted or unsubstituted $C_6$-$C_{20}$ aryl sulfonamide group, a substituted or unsubstituted $C_1$-$C_{20}$ acylamino group, a $C_1$-$C_{20}$ alkylureido group, a $C_6$-$C_{20}$ arylureido group, a $C_2$-$C_{20}$ alkoxycarbonyl group, a $C_2$-$C_{20}$ alkoxycarbonylamino group, a carbamoyl group, a sulfamoyl group, a sulfo group or its salt, a carboxy group or its salt, a substituted or unsubstituted $C_1$-$C_{20}$ hydroxyalkyloxyalkyl group, a substituted or unsubstituted $C_1$-$C_{20}$ dialkylaminoalkyl group, a substituted or unsubstituted $C_6$-$C_{20}$ pyridylalkyl group, a substituted or unsubstituted $C_5$-$C_{20}$ pyridyl group, a substituted or unsubstituted $C_6$-$C_{20}$ imidazolyl group, a hydrazine group, a hydrozone group, a substituted or unsubstituted $C_1$-$C_{20}$ pyridylalkyl group, a substituted or unsubstituted $C_6$-$C_{20}$ aryl group, a substituted or unsubstituted $C_6$-$C_{20}$ arylalkyl group, a substituted or unsubstituted $C_6$-$C_{20}$ heteroaryl group, $C_6$-$C_{20}$ heteroarylalkyl group, a substituted or unsubstituted $C_6$-$C_{20}$ heteroarylalkenyl group, or a substituted or unsubstituted $C_3$-$C_{20}$ heterocycloalkyl group; or where $R_3$ and $R_4$ link together to form a substituted or unsubstituted $C_1$-$C_{20}$ alkylene group. In one embodiment, the amide compound has the Formula I where $R_1$, $R_2$, $R_3$ and $R_4$ are as defined above with the proviso that when $R_1$ and $R_2$ are both H, $R_3$-$R_4$ together are not $C_2$ or $C_3$ alkyl and $R_3$ and $R_4$ are not H, or $C_1$-$C_3$ alkyl.

DETAILED DESCRIPTION OF THE INVENTION

The present invention will be described in more detail by describing embodiments thereof.

An ink composition according to an embodiment of the present invention comprises an amide compound represented by Formula I.

The present invention provides an ink composition including an amide compound represented by Formula I below, a coloring agent and a solvent:

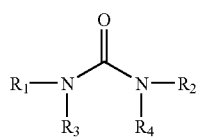

(I)

wherein $R_1$, $R_2$, $R_3$ and $R_4$ are independently a hydrogen atom, a substituted or unsubstituted $C_1$-$C_{20}$ alkyl group, a substituted or unsubstituted $C_1$-$C_{20}$ heteroalkyl group, a substituted or unsubstituted $C_2$-$C_{20}$ alkenyl group, a substituted or unsubstituted $C_1$-$C_{20}$ alkoxy group, a substituted or unsubstituted $C_1$-$C_{20}$ alkyl sulfonamide group, a substituted or unsubstituted $C_6$-$C_{20}$ aryl sulfonamide group, a substituted or unsubstituted $C_1$-$C_{20}$ acylamino group, a $C_1$-$C_{20}$ alkylureido group, a $C_6$-$C_{20}$ arylureido group, a $C_2$-$C_{20}$ alkoxycarbonyl group, a $C_2$-$C_{20}$ alkoxycarbonylamino group, a carbamoyl group, a sulfamoyl group, a sulfo group or its salt, a carboxy group or its salt, a substituted or unsubstituted $C_1$-$C_{20}$ hydroxyalkyloxyalkyl group, a substituted or unsubstituted $C_1$-$C_{20}$ dialkylaminoalkyl group, a substituted or unsubstituted $C_6$-$C_{20}$ pyridylalkyl group, a substituted or unsubstituted $C_5$-$C_{20}$ pyridyl group, a substituted or unsubstituted $C_6$-$C_{20}$ imidazolyl group, a hydrazine group, a hydrozone group, a substituted or unsubstituted $C_1$-$C_{20}$ pyridylalkyl group, a substituted or unsubstituted $C_6$-$C_{20}$ aryl group, a substituted or unsubstituted $C_6$-$C_{20}$ arylalkyl group, a substituted or unsubstituted $C_6$-$C_{20}$ heteroaryl group, $C_6$-$C_{20}$ heteroarylalkyl group, a substituted or unsubstituted $C_6$-$C_{20}$ heteroarylalkenyl group, or a substituted or unsubstituted $C_3$-$C_{20}$ heterocycloalkyl group; or where $R_3$ and $R_4$ link together to form a substituted or unsubstituted $C_1$-$C_{20}$ alkylene group. In one embodiment, the amide compound has the Formula I where $R_1$, $R_2$, $R_3$ and $R_4$ are as defined above with the proviso that when $R_1$ and $R_2$ are both H, $R_3$-$R_4$ together are not $C_2$ or $C_3$ alkyl and $R_3$ and $R_4$ are not H, or $C_1$-$C_3$ alkyl.

In Formula I, $R_3$ and $R_4$ can link together to form a substituted or unsubstituted $C_1$-$C_{10}$ alkylene group, and then form a 5~13 membered ring with —N—C(=O)—N—. In one embodiment, $R_3$ and $R_4$ form a 5~9 membered ring. In one embodiment, the amide is a 5~9 membered ring represented by Formula II below:

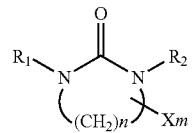

(II)

wherein $R_1$ and $R_2$ are the same as defined in Formula I;

n is an integer of 2 to 6;

m is an integer of 0 to 6; and

X represents a substituted or unsubstituted $C_1$-$C_{20}$ alkyl group, a substituted or unsubstituted $C_1$-$C_{20}$ heteroalkyl group, a substituted or unsubstituted $C_2$-$C_{20}$ alkenyl group, a substituted or unsubstituted $C_1$-$C_{20}$ alkoxy group, a substituted or unsubstituted $C_1$-$C_{20}$ alkyl sulfonamide group, a substituted or unsubstituted $C_6$-$C_{20}$ aryl sulfonamide group, a substituted or unsubstituted $C_1$-$C_{20}$ acylamino group, a $C_1$-$C_{20}$ alkylureido group, a $C_6$-$C_{20}$ arylureido group, a $C_2$-$C_{20}$ alkoxycarbonyl group, a $C_2$-$C_{20}$ alkoxycarbonylamino group, a carbamoyl group, a sulfamoyl group, a sulfo group or its salt, a carboxy group or its salt, a substituted or unsubstituted $C_1$-$C_{20}$ hydroxyalkyloxyalkyl group, a substituted or unsubstituted $C_1$-$C_{20}$ dialkylaminoalkyl group, a substituted or unsubstituted $C_6$-$C_{20}$ pyridylalkyl group, a substituted or unsubstituted $C_5$-$C_{20}$ pyridyl group, a substituted or unsubstituted $C_6$-$C_{20}$ imidazolyl group, a hydrazine group, a hydrozone group, a substituted or unsubstituted $C_1$-$C_{20}$ pyridylalkyl group, a substituted or unsubstituted $C_6$-$C_{20}$ aryl group, a substituted or unsubstituted $C_6$-$C_{20}$ arylalkyl group, a substituted or unsubstituted $C_6$-$C_{20}$ heteroaryl group, $C_6$-$C_{20}$ heteroarylalkyl group, a substituted or unsubstituted $C_6$-$C_{20}$ heteroarylalkenyl group, or a substituted or unsubstituted $C_3$-$C_{20}$ heterocycloalkyl group.

When m is zero in Formula II, another substituent group such as a $C_1$-$C_5$ alkyl, besides a hydrogen atom, is not bound to —$(CH_2)_n$— moiety.

In Formula II, $R_1$ and $R_2$ are independently selected from the group consisting of a hydrogen atom, a substituted or unsubstituted $C_1$-$C_{20}$ alkyl group, a substituted or unsubstituted $C_1$-$C_{20}$ heteroalkyl group. Examples of a 5~9 membered ring compound are represented by Formula IV and Formula V below:

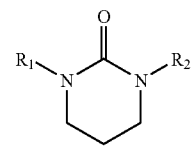

(IV)

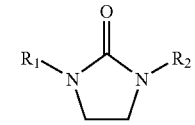

(V)

In Formula IV and V, $R_1$ and $R_2$ are independently a hydrogen atom, or a straight or branched $C_1$-$C_{10}$ alkyl group. In one embodiment, the amide compound has the structure of Formula II where $R_1$ and $R_2$ are as defined above with the proviso that when n is 2 or 3, $R_1$ and $R_2$ are not H, $C_1$ alkyl or $C_2$ alkyl.

When $R_3$ and $R_4$ are both hydrogen atoms in Formula I, an amide compound is represented by Formula III below:

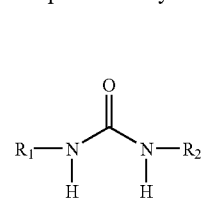

(III)

In Formula III, $R_1$ and $R_2$ are as defined in Formula I.

In one embodiment of Formula III, $R_1$ and $R_2$ are independently a hydrogen atom, a substituted or unsubstituted $C_1$-$C_{20}$ alkyl group, or a substituted or unsubstituted $C_1$-$C_{20}$ heteroalkyl group. Examples of compounds represented by Formula III include 1,1-dibutyl urea [$(C_4H_9)_2NCONH_2$], 1,1-diethyl urea [$(C_2H_5)_2NCONH_2$], 1,1-dipropyl urea [$(C_3H_7)_2NCONH_2$], 1,1-diisopropyl compound in which $R_1$ and $R_2$ are both methyl groups in Formula III is (dimethyl urea) represented by Formula VIII below. A compound in which $R_1$ and $R_2$ are both ethyl groups in Formula III is (1,3-diethyl urea) represented by Formula IX below:

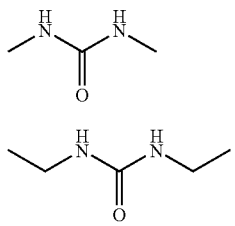

(VIII)

(IX)

In one embodiment, the amide compound has the structure of Formula III where $R_1$ and $R_2$ are as defined above with the proviso that $R_1$ and $R_2$ are not H, $C_1$ alkyl, $C_2$ alkyl or $C_3$ alkyl.

An ink composition according to an embodiment of the present invention can further comprise a polyhydric alcohol. The addition of a polyhydric alcohol in the ink composition improves the durability (e.g., water fastness and abrasion resistance) and improves bleeding resistance.

Examples of suitable polyhydric alcohols include ethylene glycol, a diethylene glycol, a triethylene glycol, a propylene glycol, a butylene glycol, a 1,4-butanediol, a 1,2,4-butanetriol, a 1,5-pentanediol, a 1,2-hexanediol, a 1,6-hexanediol, a 1,2,6-hexanetriol, a hexylene glycol, a glycerol, a glycerol ethoxylate, a trimethylol propane, a trimethylol propane ethoxylate, and mixtures thereof.

The polyhydric alcohol partially functions as a solvent in addition to functioning as a moisturizing agent as described in above.

The amide compound in the ink composition of the present invention interacts with the polyhydric alcohol used as a moisturizing agent, thereby improving durability such as water fastness and abrasion resistance and increases bleeding resistance. The inventors carried out many experiments concerning this principle and fortunately obtained good results. The mechanisms concerning this principle are not completely understood and somewhat unclear. However, the principle of the present invention can be inferred that is consistent with the scientific data.

An amide compound as shown in Formula X below can have very various resonance structures. Thus, the polarity is very high, and so it is prone to have a charge defined by an anionic moiety and a cationic moiety.

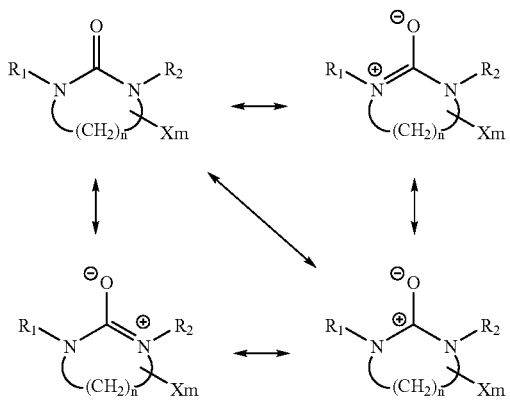

(X)

In Formula X, $R_1$, $R_2$, m and n are the same as described above.

As can be seen in Formula X, the anionic charge is delocalized in the oxygen moiety of the amide compound and a cationic charge is delocalized between the two nitrogens and the carbon between the nitrogen atoms as depicted in Formula XI below.

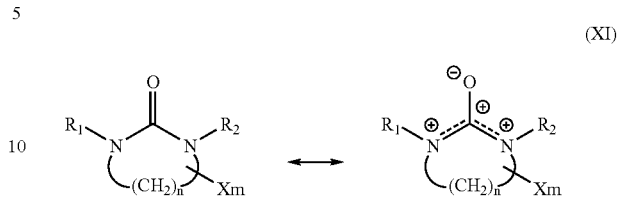

(XI)

The cationic charge delocalized between the two nitrogens of the amide carries out electrostatic interaction with a pigment, thereby decreasing the mobility of a coloring agent on the surface of a paper or other substrate. Thus, an improvement in the durability and bleeding resistance can be obtained. In one embodiment, an anion is charged on the surface of the pigment in order to increase the dispersing stability. The surface of the paper contains a large number of electrophilic or cationic groups such as —OH and —C=O, and thus the electrostatic interaction occurs between the cationic groups of the paper and the anionic groups on the pigment.

The amide of the ink composition of the present invention decreases the normally high mobility of a pigment on a surface of a paper when the ink composition contains a polyhydric alcohol. The reason is because the anionic character of the amide can be maintained by stabilizing a resonance structure of the amide through a hydrogen bond of anionic oxygen with —OH group of a polyhydric alcohol. This interaction helps to maintain the anionic character of the oxygen and maintain the cationic character of two nitrogens within the amide.

Both a dyestuff and a pigment can be used as coloring agents in an ink composition which contain the amide compound of the invention. Non-limiting examples thereof include a self-dispersing pigment, a dispersing pigment, a direct dye, an acid dye, a dispersing dye, a reactive dye, etc.

The surface tension of the ink composition according to one embodiment of the present invention is about 15 to about 70 dynes/cm at 20° C. In another embodiment, the ink composition has a surface tension of about 25 to about 55 dynes/cm at 20° C. The viscosity of the ink composition is about 1.5 to about 20 cps at 20° C. In other embodiments, the ink composition has a viscosity of about 1.5 to about 3.5 cps at 20° C.

The ink composition comprising an amide compound according to an embodiment of the present invention can be widely used in ink-jet inks, printing inks, paints, and for textile printing, paper manufacturing, cosmetics manufacturing, ceramic industry, etc.

Hereinafter, the ink composition comprising the amide compound and a pigment will be described in greater detail. However, the explanation below is one example of an ink composition comprising the amide compound and the pigment, and the invention is not limited to this specific ink composition.

The ink composition according to one embodiment of the present invention comprises a solvent, a pigment as a coloring agent and an amide composition represented by Formula I.

An aqueous liquid medium or a mixed solvent of an aqueous liquid medium and an organic solvent can be used as the solvent. The ink composition can include about 50 to about 96 parts by weight of the solvent with respect to about 4 to about 50 parts by weight of the solid content of the ink composition. The solid content refers to the sum of the amount of the amide compound of Formula I and the coloring agent in the ink composition. In one embodiment, the ink composition contains about 0.1 to about 30 parts by weight of the amide compound of Formula I based on 100 parts by weight of the solvent.

In one embodiment, the solvent component is a mixture of an organic solvent and an aqueous medium and includes about 5 to about 50 parts by weight of the organic solvent based on 100 parts by weight of the ink composition including the solvent mixture (i.e., total weight of the aqueous liquid medium and the organic solvent) and the solid content. The viscosity and surface tension of the ink composition can be controlled within a desired and proper range by the combined use of an organic solvent and an aqueous liquid medium.

The organic solvent can be one of hydrocarbon solvents such as alcohols including methyl alcohol, ethyl alcohol, n-propyl alcohol, isopropyl alcohol, n-butyl alcohol, sec-butyl alcohol, t-butyl alcohol, isobutyl alcohol, etc.; ketones such as acetone, methylethylketone, diacetone alcohol, etc.; esters such as ethyl acetate, ethyl lactate, etc.; lower alkyl ethers such as ethylene glycol monomethyl ether, ethylene glycol monoethyl ether, diethylene glycol methyl ether, diethylene glycol ethyl ether, triethylene glycol monomethyl ether, triethylene glycol monoethyl ether; N-containing compounds such as 2-pyrrolidone, N-methyl-2-pyrrolidone, caprolactam, etc; dimethyl sulfoxide, tetramethylene sulfone, thioglycol, etc. In one embodiment, the polyhydric alcohol is included in an amount of about 2 to about 50 parts by weight based on 100 parts by weight of the solvent.

The ink composition of one embodiment of the present invention further comprises additives such as a viscosity controller, a surfactant, a metal oxide, etc. If the coloring agent is not self-dispersing type like a self-dispersing pigment, the ink composition can further comprise a dispersing agent.

The surfactant of the ink composition controls the surface tension of the ink composition to stabilize jetting at a nozzle of an ink jet printer or other printing device. Surfactants for performing such function include anionic surfactants and nonionic surfactants. The ink composition can include in general level 0.01 to 1.0 parts by weight of a surfactant based on 100 parts by weight of the solvent.

A viscosity controller controls the viscosity of the ink composition to maintain smooth jetting. Suitable viscosity control aspects are selected from the group consisting of polyvinyl alcohol, casein, and carboxymethyl cellulose. The ink composition can include about 0.1 to about 10 parts by weight of a viscosity controller based on 100 parts by weight of the solvent.

The ink composition can include about 0.5 to about 10 parts by weight of a coloring agent based on 100 parts by weight of the solvent. If a coloring agent is included in less than this range, it is difficult for the coloring agent to carry out its intended function. If the amount of the coloring agent exceeds the range, storage stability can be reduced.

The ink composition may further comprise acids or bases. The acids or bases increase the solubility of moisturizing agents in solvents and stabilize the pigments. The ink composition can include about 0.01 to about 5 parts by weight of an acid or a base based on 100 parts by weight of the solvent.

A method of preparing the ink composition is performed as follows.

First, a self-dispersing pigment as a coloring agent, a viscosity controller, a surfactant, and an amide of Formula I are added to a solvent and then mixed. Thereafter, the resulting mixture is filtered through a filter to obtain the ink composition according to an embodiment of the present invention.

The ink composition including an amide compound of the invention and a self-dispersing pigment can be used in toner compositions, various paints, coating liquids, and the like in addition to ink compositions, and its use is not particularly limited.

In these examples, the embodiments of the present invention are evaluated with respect to their characteristics in ink, and these evaluation methods can also be applied to wet toners, dry toners, paints and/or coating liquids. Hereinafter, only an ink composition is described as representative of the examples about the ink composition comprising the amide compound and the self-dispersing pigment. It will be understood that the present invention is not limited to an ink composition.

Thus, the present invention will be described in greater detail with reference to the following examples. The following examples are for illustrative purposes and are not intended to limit the scope of the invention.

EXAMPLE 1

6.0 g of a carbon black (FW18, manufactured by Degussa Co.), 10.0 g of 1,3-dimethyl-3,4,5,6-tetrahydro-2(1H)-pyrimidone having structural formula below, 69.0 g of water, 4.0 g of 1,4-butanediol, 3.0 g of butylene glycol and 10.0 g of glycerol ethoxylate were mixed and stirred sufficiently in a stirrer for more than 30 minutes to a homogeneous state. Then, the resulting product was filtered through a 0.45 μm filter to obtain an ink composition.

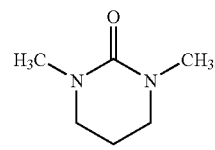

EXAMPLE 2-6

An ink composition was prepared according to the same method used in Example 1, except that 1,3-dimethyl-2-imidazoline, 1,3-dimethyluracil, 5,5-dimethylhydantoin, an urea and 1,3-dimethyl urea, respectively having a structural formulas below, were used instead of 1,3-dimethyl-3,4,5,6-tetrahydro-2(1H)-pyrimidone.

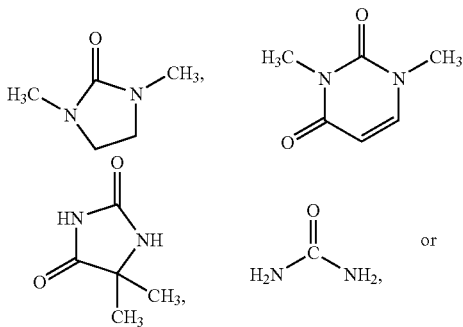

-continued

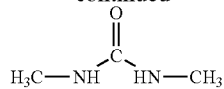

COMPARATIVE EXAMPLE 1

An ink composition was prepared according to the same method used in Example 1, except that 1,3-dimethyl-3,4,5,6-tetrahydro-2(h1H)-pyrimidone was not used.

COMPARATIVE EXAMPLES 2-6

An ink composition was prepared according to the same method used in Example 1, except that a carbon black (Regal 330, manufactured by Cabot Co.), a carbon black (Black Pearl L, manufactured by Cabot Co.), a Carbon Black (No. 25B, manufactured by Mitsubishi Co.), a carbon black (No. 258, manufactured by Mitsubishi Co.), a carbon black (Valcan XC-72R, manufactured by Cabot Co.), were used respectively instead of the carbon black (FW18, manufactured by Degussa Co.), and 1,3-dimethyl-3,4,5,6-tetrahydro-2(1H)-pyrimidone was not used.

The properties of the ink compositions prepared according to the above Examples 1-6 and Comparative Examples 1-6 were measured according to the following methods.

EXPERIMENTAL EXAMPLE 1

Test of Long-term Storage Stability 100 ml of the ink compositions prepared according to above Examples 1-6 were respectively placed into heat resistant vials; the opening of the vials was closed, and the vials were stored in an incubator at a temperature of 60° C. After remaining at this state for 2 months, and it was determined whether precipitates were formed at the bottom of the vials. The results are shown in Table 1 below.
O: No Precipitates.
X: Precipitates occurred.

TABLE 1

| Sort | Examples | | | | | | Comparative Examples | | | | | |
|---|---|---|---|---|---|---|---|---|---|---|---|---|
| | 1 | 2 | 3 | 4 | 5 | 6 | 1 | 2 | 3 | 4 | 5 | 6 |
| Evaluation | O | O | O | O | O | O | X | O | O | X | O | X |

From the Table 1, it was found that for the ink compositions prepared according to Examples 1-6 obtained according to the present invention, precipitates were not formed. Comparative Examples 1-6 resulted in some precipitates forming. From this result, it can be seen that the ink compositions prepared according to Examples 1-6 had superior storage stability.

EXPERIMENTAL EXAMPLE 2

Test of Dispersion Stability

The ink compositions prepared according to Examples 1-6 and Comparative Examples 1-6 were left standing for 4 hours at 60° C. and for 4 hours at −40° C. This procedure was repeated 10 times (Thermal Cycle), and then the time that was required to filter the ink composition at a pressure at 1 μm membrane was determined. The results are shown in Table 2 below.

A=[filtering time(after TC)-filtering time(before TC)]/filtering time(before TC)×100 (%)
O: A<10
Δ: 10≦A<20
X: A>20

TABLE 2

| Sort | Examples | | | | | | Comparative Example | | | | | |
|---|---|---|---|---|---|---|---|---|---|---|---|---|
| | 1 | 2 | 3 | 4 | 5 | 6 | 1 | 2 | 3 | 4 | 5 | 6 |
| Evaluation | O | O | O | O | O | O | O | X | Δ | O | Δ | Δ |

Table 2 shows that the dispersion stability of the compositions of Examples 1-6 according to the present invention is superior to those of Comparative Examples 1-6 using general pigments.

EXPERIMENTAL EXAMPLE 3

Test of Nozzle Occlusion

The ink compositions prepared according to Examples 1-6 and Comparative Examples 1-6 were placed in a Samsung ink cartridge at ambient temperature (25° C.) and at low temperature (−18° C.) for 2 weeks, and then the degree by which a nozzle occluded such that it could not jet an ink when printing was evaluated as follows. The results are shown in Table 3 below.
O: The occlusion of all nozzles was not observed
Δ: The occlusion of 1 or 2 nozzles was observed
X: The occlusion of more than 3 nozzles was observed

TABLE 3

| Sort | Examples | | | | | | Comparative Example | | | | | |
|---|---|---|---|---|---|---|---|---|---|---|---|---|
| | 1 | 2 | 3 | 4 | 5 | 6 | 1 | 2 | 3 | 4 | 5 | 6 |
| Evaluation (Am. Temp.) | O | O | O | O | O | O | Δ | X | O | Δ | O | O |
| Evaluation (Low Temp.) | O | O | O | O | O | O | X | X | O | X | O | O |

EXPERIMENTAL EXAMPLE 4

Test of Rub Fastness

The ink compositions prepared according to Examples 1-6 and Comparative Examples 1-6 were refilled into a Samsung ink cartridge M-50 (manufactured by Samsung Co.), and then 2 cm×10 cm bar picture was printed on a printer (MJC-2400C, manufactured by Samsung Co.). The resulting image was dried for 24 hours, and then when rubbing the image 5 times using a tester, OD of transferred image of the bar picture was compared to OD of the image of the bar picture before rubbing and expressed in percentage. The results were evaluated as follows and are shown in Table 4 below.

A=(OD of transferred image/OD of original bar picture)×100 (%)
O: A<20
Δ: 20≦A<30
X: A>30

TABLE 4

| Sort | Examples | | | | | | Comparative Examples | | | | | |
|---|---|---|---|---|---|---|---|---|---|---|---|---|
| | 1 | 2 | 3 | 4 | 5 | 6 | 1 | 2 | 3 | 4 | 5 | 6 |
| Evaluation | ○ | ○ | ○ | Δ | ○ | Δ | X | X | X | X | X | X |

EXPERIMENTAL EXAMPLE 5

Test of Water Fastness

The ink compositions prepared according to Examples 1-6 and, Comparative Examples 1-6 were refilled into a Samsung ink cartridge M-50 (manufactured by Samsung Co.), and then 2 cm×10 cm bar picture was printed on a printer (MJC-2400C, manufactured by Samsung Co.). After 5 minutes, 5 droplets of water were dropped to the resulting image. The image was dried for 24 hours, and then OD decreased after water flowed down was compared to OD of the original bar picture and expressed in percentage. The results were evaluated as follows and are shown in Table 5 below.

A=(OD of image after water flowed down/OD of original bar picture)×100 (%)

○: A>95

Δ: 90≦A<95

X: A<90

TABLE 5

| Sort | Examples | | | | | | Comparative Examples | | | | | |
|---|---|---|---|---|---|---|---|---|---|---|---|---|
| | 1 | 2 | 3 | 4 | 5 | 6 | 1 | 2 | 3 | 4 | 5 | 6 |
| Evaluation | ○ | ○ | ○ | Δ | ○ | Δ | X | Δ | X | X | Δ | X |

EXPERIMENTAL EXAMPLE 6

Test of Bleeding Resistance

The ink compositions prepared according to Examples 1-6 and Comparative Examples 1-6 were refilled into a Samsung ink cartridge M-50 (manufactured by Samsung Co.), and then a test pattern was printed with color ink on a printer (MJC-2400C, manufactured by Samsung Co.). After 30 minutes, the position of dot line at which color mixing occurred based on borderline of two adjacent colors was measured with a microscope, and the results are shown in Table 6 below.

The degree of bleeding resistance is evaluated based on the following.

5: Color mixing did not appear throughout the borderline.

4: Color mixing appeared at the width corresponding to 1 dot diameter.

3: Color mixing appeared at the width corresponding to 2 dots diameter.

2: Color mixing appeared at the width corresponding to 3 dots diameter.

1: Color mixing appeared at the width corresponding to 4 or more dots diameter (based on 600 dpi, 1 dot diameter=100 μm)

TABLE 6

| Sort | Examples | | | | | | Comparative Examples | | | | | |
|---|---|---|---|---|---|---|---|---|---|---|---|---|
| | 1 | 2 | 3 | 4 | 5 | 6 | 1 | 2 | 3 | 4 | 5 | 6 |
| Evaluation | 5 | 5 | 4 | 5 | 5 | 4 | 3 | 2 | 2 | 3 | 3 | 2 |

As can be seen in Table 6, the bleeding phenomenon of the compositions of Examples 1-6 is decreased compared to those of Comparative Examples 1-6.

The amide compound and the polyhydric alcohol comprised in the ink composition according to embodiments of the present invention decrease the mobility of coloring agents and increase the adhesion to media, thereby minimizing the bleeding between colors of printed images, and improving the water fastness and dry and wet rub fastness to provide good color fastness on papers. The ink composition according to embodiments of the present invention also improves the quality of printed image, and has good long-term storage stability as well. Thus, the ink composition according to embodiments of the present invention can be widely used ink-jet inks, printing inks, paints, textile printing, paper manufacturing, cosmetics manufacturing, ceramic industry, etc.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An ink composition comprising an amide compound represented by formula I, a coloring agent and a solvent:

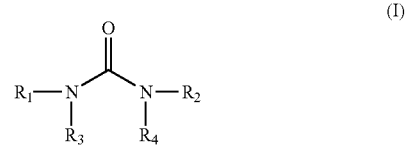

(I)

wherein $R_1$, $R_2$, $R_3$ and $R_4$ are independently a substituted or unsubstituted $C_1$-$C_{20}$ heteroalkyl group, a substituted or unsubstituted $C_2$-$C_{20}$ alkenyl group, a substituted or unsubstituted $C_1$-$C_{20}$ alkoxy group, a substituted or unsubstituted $C_1$-$C_{20}$ alkyl sulfonamide group, a substituted or unsubstituted $C_6$-$C_{20}$ aryl sulfonamide group, a substituted or unsubstituted $C_1$-$C_{20}$ acylamino group, a $C_1$-$C_{20}$ alkylureido group, a $C_6$-$C_{20}$ arylureido group, a $C_2$-$C_{20}$ alkoxycarbonyl group, a $C_2$-$C_{20}$ alkoxycarbonylamino group, a carbamoyl group, a sulfamoyl group, a sulfo group or its salt, a carboxy group or its salt, a substituted or unsubstituted $C_1$-$C_{20}$ dialkylaminoalkyl group, a substituted or unsubstituted $C_6$-$C_{20}$ pyridylalkyl group, a substituted or unsubstituted $C_5$-$C_{20}$ pyridyl group, a substituted or unsubstituted $C_6$-$C_{20}$ imidazolyl group, a hydrazine group, a hydrozone group, a substituted or unsubstituted $C_1$-$C_{20}$ pyridylalkyl group, a substituted or unsubstituted $C_6$-$C_{20}$ aryl group, a substituted or unsubstituted $C_6$-$C_{20}$ arylalkyl group, a substituted or unsubstituted $C_6$-$C_{20}$ heteroaryl group, $C_6$-$C_{20}$ heteroarylalkyl group, a substituted or unsubstituted $C_6$-$C_{20}$ heteroarylalkenyl group, or a substituted or unsubstituted $C_3$-$C_{20}$ heterocycloalkyl group; or $R_3$ and $R_4$ link together to form an unsubstituted $C_1$-$C_{20}$ alkylene group.

2. The ink composition of claim 1, further comprising a polyhydric alcohol.

3. The ink composition of claim 2, wherein the polyhydric alcohol is at least one alcohol selected from the group consisting of an ethylene glycol, a diethylene glycol, a triethylene glycol, a propylene glycol, a butylene glycol, a 1,4-butanediol, a 1,2,4-butanetriol, a 1,5-pentanediol, a 1,2-hexanediol, a 1,6-hexanediol, a 1,2,6-hexanetriol, a hexylene glycol, a glycerol, a glycerol ethoxylate, a trimethylol propane and a trimethylol propane ethoxylate.

4. The ink composition of claim 2, wherein said polyhydric alcohol is included in said ink composition in an amount of about 2 to about 50 parts by weight based on 100 parts by weight of said solvent.

5. An ink composition comprising an amide compound represented by Formula II below:

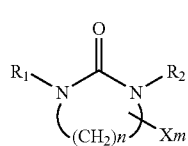

(II)

wherein $R_1$ and $R_2$ are independently a substituted or unsubstituted $C_1$-$C_{20}$ heteroalkyl group, a substituted or unsubstituted $C_2$-$C_{20}$ alkenyl group, a substituted or unsubstituted $C_1$-$C_{20}$ alkoxy group, a substituted or unsubstituted $C_1$-$C_{20}$ alkyl sulfonamide group, a substituted or unsubstituted $C_6$-$C_{20}$ aryl sulfonamide group, a substituted or unsubstituted $C_1$-$C_{20}$ acylamino group, a $C_1$-$C_{20}$ alkylureido group, a $C_6$-$C_{20}$ arylureido group, a $C_2$-$C_{20}$ alkoxycarbonyl group, a $C_2$-$C_{20}$ alkoxycarbonylamino group, a carbamoyl group, a sulfamoyl group, a sulfo group or its salt, a carboxy group or its salt, a substituted or unsubstituted $C_1$-$C_{20}$ dialkylaminoalkyl group, a substituted or unsubstituted $C_6$-$C_{20}$ pyridylalkyl group, a substituted or unsubstituted $C_5$-$C_{20}$ pyridyl group, a substituted or unsubstituted $C_6$-$C_{20}$ imidazolyl group, a hydrazine group, a hydrozone group, a substituted or unsubstituted $C_1$-$C_{20}$ pyridylalkyl group, a substituted or unsubstituted $C_6$-$C_{20}$ aryl group, a substituted or unsubstituted $C_6$-$C_{20}$ arylalkyl group, a substituted or unsubstituted $C_6$-$C_{20}$ heteroaryl group, a $C_6$-$C_{20}$ heteroarylalkyl group, a substituted or unsubstituted $C_6$-$C_{20}$ heteroarylalkenyl group or a substituted or unsubstituted $C_3$-$C_{20}$ heterocycloalkyl group;

n is an integer of 2 to 6;

m is an integer of 0 to 6; and

X represents a hydrogen atom, a substituted or unsubstituted $C_1$-$C_{20}$ alkyl group, a substituted or unsubstituted $C_1$-$C_{20}$ heteroalkyl group, a substituted or unsubstituted $C_2$-$C_{20}$ alkenyl group, a substituted or unsubstituted $C_1$-$C_{20}$ alkoxy group, a substituted or unsubstituted $C_1$-$C_{20}$ alkyl sulfonamide group, a substituted or unsubstituted $C_6$-$C_{20}$ aryl sulfonamide group, a substituted or unsubstituted $C_1$-$C_{20}$ acylamino group, a $C_1$-$C_{20}$ alkylureido group, a $C_6$-$C_{20}$ arylureido group, a $C_2$-$C_{20}$ alkoxycarbonyl group, a $C_2$-$C_{20}$ alkoxycarbonylamino group, a carbamoyl group, a sulfamoyl group, a sulfo group or its salt, a substituted or unsubstituted $C_1$-$C_{20}$ hydroxyalkyloxyalkyl group, a substituted or unsubstituted $C_1$-$C_{20}$ dialkylaminoalkyl group, a substituted or unsubstituted $C_6$-$C_{20}$ pyridylalkyl group, a substituted or unsubstituted $C_5$-$C_{20}$ pyridyl group, a substituted or unsubstituted $C_6$-$C_{20}$ imidazolyl group, a hydrazine group, a hydrozone group, a substituted or unsubstituted $C_1$-$C_{20}$ pyridylalkyl group, a substituted or unsubstituted $C_6$-$C_{20}$ aryl group, a substituted or unsubstituted $C_6$-$C_{20}$ arylalkyl group, a substituted or unsubstituted $C_6$-$C_{20}$ heteroaryl group, $C_6$-$C_{20}$ heteroarylalkyl group, a substituted or unsubstituted $C_6$-$C_{20}$ heteroarylalkenyl group, or a substituted or unsubstituted $C_3$-$C_{20}$ heterocycloalkyl group.

6. An ink composition comprising an amide compound of Formula IV, a coloring agent and a solvent:

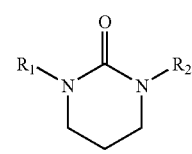

(IV)

wherein $R_1$ and $R_2$ independently represent a straight or branched $C_1$-$C_{10}$ alkyl group.

7. An ink composition comprising an amide compound, coloring agent, and a solvent wherein the amide compound of the formula I is represented by Formula III below:

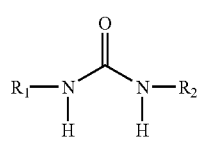

(III)

wherein $R_1$ and $R_2$ are independently a substituted or unsubstituted $C_1$-$C_{20}$ heteroalkyl group, a substituted or unsubstituted $C_2$-$C_{20}$ alkenyl group, a substituted or unsubstituted $C_1$-$C_{20}$ alkoxy group, a substituted or unsubstituted $C_1$-$C_{20}$ alkyl sulfonamide group, a substituted or unsubstituted $C_6$-$C_{20}$ aryl sulfonamide group, a substituted or unsubstituted $C_1$-$C_{20}$ acylamino group, a $C_1$-$C_{20}$ alkylureido group, a $C_6$-$C_{20}$ arylureido group, a $C_2$-$C_{20}$ alkoxycarbonyl group, a $C_2$-$C_{20}$ alkoxycarbonylamino group, a carbamoyl group, a sulfamoyl group, a sulfo group or its salt, a carboxy group or its salt, a substituted or unsubstituted $C_1$-$C_{20}$ hydroxyalkyloxyalkyl group, a substituted or unsubstituted $C_1$-$C_{20}$ dialkylaminoalkyl group, a substituted or unsubstituted $C_6$-$C_{20}$ pyridylalkyl group, a substituted or unsubstituted $C_5$-$C_{20}$ pyridyl group, a substituted or unsubstituted $C_6$-$C_{20}$ imidazolyl group, a hydrazine group, a hydrozone group, a substituted or unsubstituted $C_1$-$C_{20}$ pyridylalkyl group, a substituted or unsubstituted $C_6$-$C_{20}$ aryl group, a substituted or unsubstituted $C_6$-$C_{20}$ arylalkyl group, a substituted or unsubstituted $C_6$-$C_{20}$ heteroaryl group, $C_6$-$C_{20}$ heteroarylalkyl group, a substituted or unsubstituted $C_6$-$C_{20}$ heteroarylalkenyl group, or a substituted or unsubstituted $C_3$-$C_{20}$ heterocycloalkyl group.

8. The ink composition of claim 1, wherein said ink composition comprises about 0.1 to about 30 parts by weight of said amide compound of Formula I based on 100 parts by weight of said solvent.

9. The ink composition of claim 1, wherein said solvent is an aqueous liquid medium, or a mixture of an aqueous liquid medium and an organic solvent.

10. The ink composition of claim 1, wherein said ink composition comprises about 0.5 to about 10 parts by weight of said coloring agent based on 100 parts by weight of said solvent.

11. The ink composition of claim 1, wherein said ink composition has a surface tension of about 15 to about 70 dynes/cm at 20° C., and has a viscosity of about 1.5 to about 20 cps at 20° C.

\* \* \* \* \*